Sept. 12, 1939.    R. H. LOCKYER    2,172,514
COMBINATION FLOWERPOT
Filed March 9, 1938
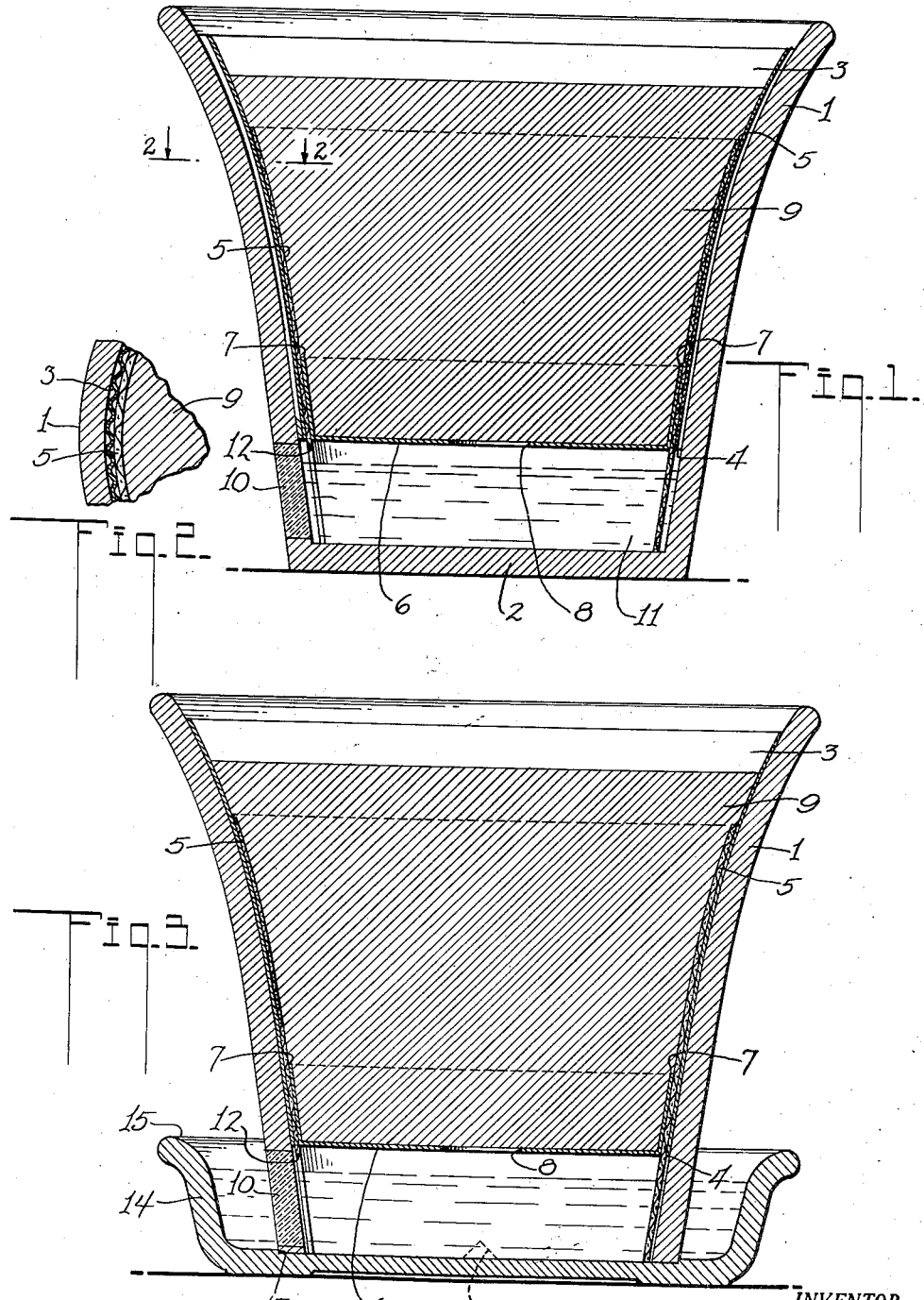
INVENTOR.
ROBERT H. LOCKYER
BY Munn, Anderson & Liddy
ATTORNEYS.

Patented Sept. 12, 1939

2,172,514

UNITED STATES PATENT OFFICE 2,172,514

COMBINATION FLOWERPOT

Robert H. Lockyer, San Francisco, Calif.

Application March 9, 1938, Serial No. 194,823

3 Claims. (Cl. 47—38)

My invention relates to improvements in a combination flowerpot, and it consists of the combinations, constructions and arrangements hereinafter described and claimed.

An object of my invention is to provide an improvement over the forms of the inventions on combination flowerpots, shown in my Patents Nos. 2,072,172, issued March 2, 1937, and 2,081,337, issued May 25, 1937. In Patent No. 2,072,172, I show an asbestos wick that extends from a reservoir of water up along the outside of a flowerpot, over the top and then down along the inside of the pot to a point where the end of the wick will be embedded in the dirt contained in the pot. The wick entirely encircles the outside of the pot and is hidden from view by a shield. A modified form in the patent shows a plurality of separated wicks instead of one circular wick and these separated wicks are passed through slots near the top of the pot.

In Patent No. 2,081,337, I show separated wicks extending up on the inside of the flowerpot and passing through perforations in a false bottom of the pot. The wicks extend into a water reservoir positioned below the false bottom.

In the present form of the invention, I show a simplified combination, consisting of a circular asbestos wick placed within a flowerpot and extending past a false bottom and down into a water reservoir. The bottom of the flowerpot may be closed for forming a water reservoir or it may be opened and the flowerpot placed in a saucer which constitutes a water reservoir. In the latter case, an opening is provided in the bottom of the flowerpot wall so that water can readily pass from the saucer into the space below the false bottom.

Where the flowerpot is closed at the bottom, fresh water when added to the reservoir, must be poured onto the top of the pot where it will percolate through the soil and down into the water reservoir. Where the saucer type of flowerpot is used, fresh water may be supplied at the top of the flower pot as in the former case or it may be poured directly into the saucer. In both cases, water is continually fed from the water reservoir to the soil by the wick, and the raising of the water in the wick is accomplished by capillary attraction.

The flowerpot is provided with a transparent portion that acts as a window, and this window is placed near the bottom of the flowerpot so that the level of liquid in the reservoir can be observed. It is obvious that the entire flowerpot may be made transparent and therefore obviate the necessity of a window.

The circular wick is preferably enclosed in a jacket and this jacket may be bodily removed from the flowerpot when it is desired to repot the plant, and will carry with it the wick, false bottom, and the soil, leaving only the empty flowerpot.

Other objects and advantages will appear in the following specification, and the novel features of the device will be particularly pointed out in the appended claims.

My invention is illustrated in the accompanying drawing forming a part of this application, in which Figure 1 is a vertical section through a flowerpot provided with a closed bottom;

Figure 2 is a section along the line 2—2 of Figure 1; and

Figure 3 is a vertical section through a flowerpot, similar to Figure 1, but provided with a saucer for closing an open bottom.

In carrying out my invention, I provide a flowerpot indicated generally at 1 and this pot is provided with a closed bottom 2. The pot may be made of any material desired and of any shape and color. Within the pot I place a jacket 3 that is in the form of a truncated cone and the jacket may extend to the bottom of the flowerpot or it may terminate a slight distance from the bottom as shown at 4. The jacket 3 is preferably corrugated as shown in Figure 2.

A circular wick 5, preferably made of asbestos, is disposed within the jacket 3 and extends to the bottom of the flowerpot. This wick may be woven in a circle or it may be cut from a flat piece and the ends brought into an abutting relation. A false bottom 6 is placed within the wick and has a flange or rim 7 that bears against the wick and supports the false bottom, above the pot bottom 2. The false bottom is also provided with a central opening 8. It is obvious that the false bottom 6 may be perforated in a number of places, if desired.

The false bottom cooperates with the wick and with the jacket 3 in acting as a receptacle for dirt 9. If the wall of the flowerpot is made of non-transparent material, a window 10 comprising a transparent portion may be provided in the wall of a flowerpot and near the bottom 2, in order that the liquid level in the water reservoir may be noted.

From the foregoing description of the various parts of the device, the operation thereof may be readily understood.

The flowerpot is used in the same manner as a standard flowerpot. The water is poured into the top of the pot and will percolate through the soil 9 and any excess water will pass through the opening 8 and into the water reservoir 11. The corrugations in the jacket 3 strengthen the jacket and permit air to escape from the reservoir as additional water is fed into the reservoir. The portion of the wick extending into the reservoir will become saturated and through capillary attraction, the entire wick will gradually and continually convey water from the reservoir up into the soil. In this way the soil is kept moist at all times.

When it is desired to repot the plant, the jacket 3 may be lifted and will carry with it the wick, false bottom, and soil. If desired, the jacket may be dispensed with, and in this case, the wick will lie against the inner surface of the flowerpot wall. The wick should be slotted at 12 and adjacent to the window 10 so that it will not interfere with a person noting the water level in the reservoir.

In the modified form of the invention, shown in Figure 3, the parts that are identical to those shown in Figure 1 will be given like reference numerals. In the modified form, the bottom of the flowerpot is open as at 13 and is placed in a saucer indicated generally at 14. The rim 15 of the saucer is disposed slightly higher than the false bottom 6. The flowerpot wall has a recess 16 therein and this will permit water that is poured into the saucer to flow through the recess and into the water reservoir beneath the false bottom.

The operation of this form of the device is identical to that shown in Figure 1. Fresh water may be added to the reservoir by pouring it in at the top of the flowerpot or by pouring it in the saucer. It is possible to cut the wick and provide areas of different sizes, below and above the false bottom 6, so that the amount of water conveyed to the soil 9 from the reservoir may be controlled.

While I have shown only the preferred forms of my invention, it should be understood that various changes or modifications may be made within the scope of the appended claims without departing from the spirit of the invention.

I claim:

1. A combination flowerpot comprising an earth retaining receptacle having a conical-shaped side, a conical-shaped wick placed within the receptacle and extending to the bottom thereof, a perforated false bottom having a diameter greater than the inner diameter of the receptacle bottom, whereby the false bottom will engage with the wick and be supported a spaced distance above the receptacle bottom, thus providing a water reservoir, the wick uniformly conveying water from the reservoir to the circumference of the earth in the receptacle by capillary attraction.

2. A combination flowerpot comprising an earth retaining receptacle having a conical-shaped side, a conical-shaped corrugated jacket placed within the receptacle and bearing against the inner wall of the receptacle, a conical-shaped wick placed within the jacket and extending to the bottom of the receptacle, a perforated false bottom having a diameter greater than the inner diameter of the receptacle bottom, whereby the false bottom will be supported by the wick a spaced distance above the receptacle bottom, thus providing a water reservoir, the corrugated jacket being removable from the receptacle and carrying the wick, false bottom, and dirt therewith, the corrugations not only reinforcing the jacket, but providing ducts from the reservoir to the top of the receptacle, said ducts permitting air to escape from the reservoir as water is added thereto, said wick uniformly conveying water from the reservoir to the circumference of the earth by capillary attraction.

3. A combination flowerpot comprising an earth retaining receptacle having a conical-shaped side, a conical-shaped wick placed within the receptacle and extending to the bottom thereof, and a perforated false bottom having an outwardly flared flanged side for engaging with the wick and supporting the false bottom above the receptacle bottom.

ROBERT H. LOCKYER.